United States Patent [19]
Koechlein et al.

[11] Patent Number: 5,123,436
[45] Date of Patent: Jun. 23, 1992

[54] PLUNGER-TYPE FUEL PRESSURE REGULATOR

[75] Inventors: Gregg W. Koechlein; Werner O. Wizemann; Ted E. Deeds, all of Carson City, Nev.

[73] Assignee: Mallory, Inc., Carson City, Nev.

[21] Appl. No.: 787,744

[22] Filed: Nov. 4, 1991

Related U.S. Application Data

[60] Continuation of Ser. No. 608,284, Nov. 2, 1990, abandoned, which is a division of Ser. No. 544,428, Jun. 27, 1990, Pat. No. 4,998,557.

[51] Int. Cl.$^5$ ............................................. G05D 16/02
[52] U.S. Cl. ................................. 137/12; 137/505.42; 251/332
[58] Field of Search ............... 137/505.37, 505.42, 137/12, 2; 251/332

[56] References Cited

U.S. PATENT DOCUMENTS

| | | | |
|---|---|---|---|
| 2,209,216 | 7/1940 | Wile | 137/505.42 |
| 2,297,535 | 9/1942 | Bryant | 251/333 |
| 2,720,892 | 10/1955 | Mitchell | 137/505.37 |
| 2,860,658 | 11/1958 | Sencsky | 137/505.37 |
| 2,915,278 | 12/1959 | Crist | 251/122 |
| 2,959,188 | 10/1960 | Kepner | 251/364 |
| 2,973,007 | 2/1961 | Schutmaat | 137/505.41 |
| 3,071,153 | 1/1963 | Cornelius | 251/332 |
| 3,075,545 | 1/1963 | Eichelman | 137/505.42 |
| 3,085,783 | 4/1963 | Pulling | 251/332 X |
| 3,308,852 | 3/1967 | Parker et al. | 251/122 |
| 3,337,180 | 8/1967 | Carlton | 251/121 |
| 3,438,170 | 7/1969 | Vogeli | 251/122 |
| 3,503,585 | 3/1970 | Vogeli | 251/121 |
| 3,517,552 | 6/1970 | Converse, III et al. | 73/118.1 |
| 3,524,344 | 8/1970 | Converse, III et al. | 73/118.1 |
| 3,612,479 | 10/1971 | Smith | 251/900 |
| 3,682,437 | 8/1972 | Miller | 137/505.42 |
| 3,703,273 | 11/1972 | Illina | 251/122 |
| 3,762,436 | 10/1973 | Clayton | 137/505.37 X |
| 3,791,413 | 2/1974 | Muller et al. | 251/122 |
| 3,990,470 | 11/1976 | Malec | 137/505.37 |
| 4,074,694 | 2/1978 | Lee | 251/332 X |
| 4,121,619 | 10/1978 | Pauliukonis | 137/509 |
| 4,457,329 | 7/1984 | Werley et al. | 137/505.42 X |
| 4,549,718 | 10/1985 | Seger | 251/121 |
| 4,624,444 | 11/1866 | Johnson | 137/509 |
| 4,643,222 | 2/1987 | Wiser | 137/528 |
| 4,660,597 | 4/1987 | Cowles | 137/505.42 |
| 4,720,076 | 1/1988 | Hyde | 251/122 |
| 4,728,077 | 3/1988 | Takahashi | 251/900 |

*Primary Examiner*—Stephen M. Hepperle
*Attorney, Agent, or Firm*—Roylance, Abrams, Berdo & Goodman

[57] ABSTRACT

An improved pressure regulator for use in racing and other high demand environments for use with a high pressure, high output pump. The sealing plunger is designed to make a hard surface seal and also carries an "O"-ring to form a secondary seal. The primary function of the "O"-ring however, is to create a venturi in the normal ranges of operation to thus create a cushion area which prevents chattering, hydraulic hammering, pulsations, and the like in the fuel flow through the regulator.

13 Claims, 3 Drawing Sheets

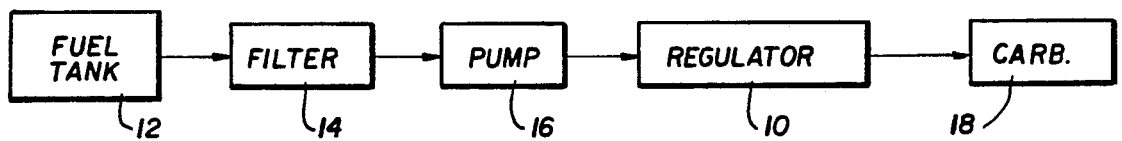
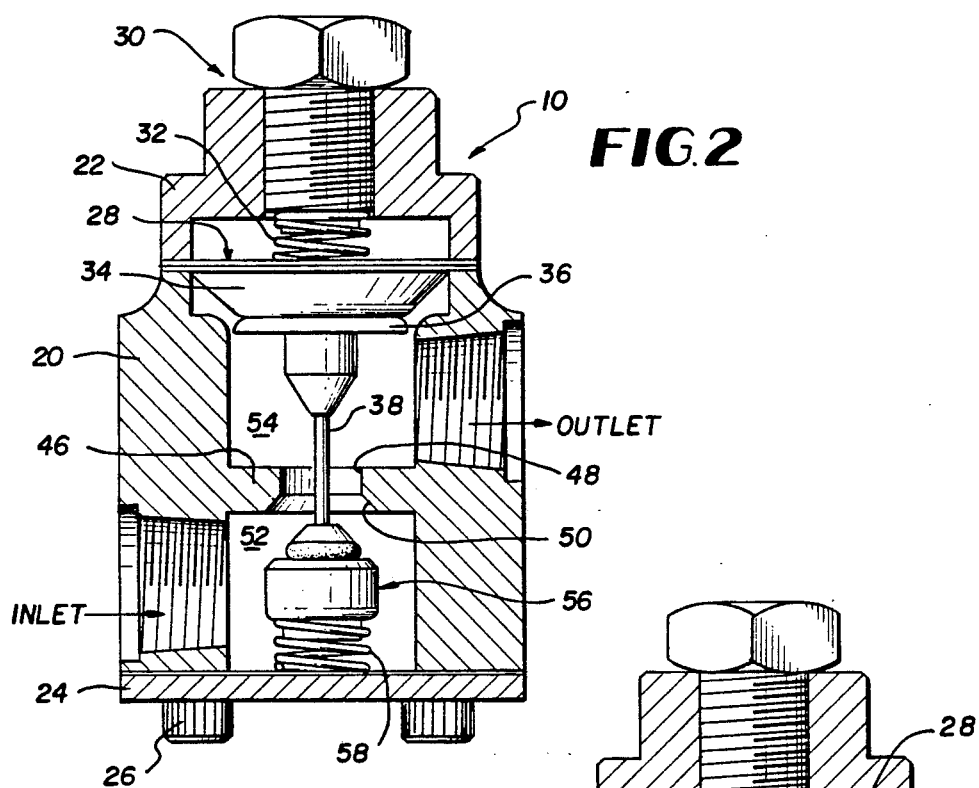
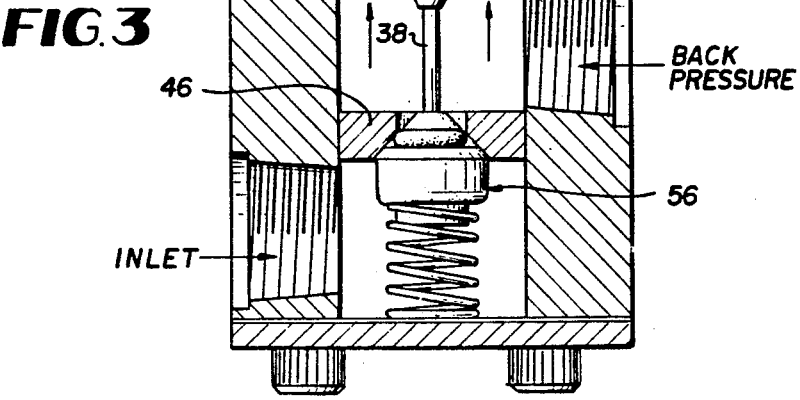

PLUNGER-TYPE FUEL PRESSURE REGULATOR

This is a continuation of application Ser. No. 07/608,284 filed Nov. 2, 1990 now abandoned, which is a division of application Ser. No. 07/544,428 filed Jun. 27, 1990 now U.S. Pat. No. 4,998,557, the entire disclosure and prosecution of which is hereby incorporated by reference as if here set forth in full.

FIELD OF THE INVENTION

This invention relates to pressure regulators for use in the fuel systems of high performance or racing automobiles. More particularly, the invention teaches a throttling type of pressure regulator for use with the simpler types of such regulators.

ENVIRONMENT OF THE INVENTION

The present invention is a liquid fluid pressure regulator, it is not adapted for use with gases. Accordingly, the prior art of gases are not applicable. Primarily, the difference is that the sizes and the nature of the seals are quite different for liquids than for gases.

More in particular as to the field of application, the invention works with relatively high volume, relatively high pressure fuel pumps for use in racing engines. It is desired that the pump output considerably more volume and pressure than the carburetor or the like can utilize, in order to be assured that there will be adequate fuel at all times during the great demands of racing usage. Because the pump puts out much more fuel and at a higher pressure than the carburetors require, a regulator to control this volume and pressure and make it compatible with the point of use, is required. The invention is such a device.

The prior art teaches several different kinds of such regulators. Among those are regulators having a return line from the regulator to the fuel tank. The invention is of the type that has no such return line. With the return line, the problems solved by the invention, discussed below, are of less impact. However, the provision of a return line is an additional expense and an additional bother as well as presenting a danger for the user. In particular, the return line requires entry into the fuel tank itself to return the by-passed fuel. The invention does not use such a by-pass system, which has advantages, but has certain problems in the prior art, which problems are solved by the present invention. Likewise, the invention has little applicability to pilot-type control valves. In summary, the invention was developed for and is applicable for use with the well-developed and relatively simple diaphragm operated valves.

BACKGROUND OF THE INVENTION

Regulators of the general type set forth in the paragraphs above are usually one of two types. These are the ball valve types and the plunger types. The present invention is of the plunger type. Both types suffer from the same problem when used in the environment of the invention, and that is that they tend to pulsate, fluctuate, create hydraulic hammering and the like in use. All of these conditions are totally unacceptable in the racing and high performance areas. Such undesirable effects as pulsations and the like can cause an overlean condition of the fuel, can even cause total starvation of fuel, both of which can cause the car to stall. Even the slightest pulsations, which may not even be discernible to a driver or passenger in the car, will cost a loss of power, which, even though small, can mean the difference between winning and losing a race. Racing drivers are extremely sensitive to proper delivery of fuel, and their racing vehicles are routinely fitted with gauges and instrumentation so that they can observe the pressure in the fuel system. Any such pulsation, fluctuation or the like will be instantly discernible from the gauges, even though it is small enough so as to have no noticeable effect on the performance of the car, that is, noticeable to the driver using his normal human senses only. The power loss however will definitely be there, and thus this problem must be solved.

As stated above, bypass or return line type of regulators do solve this problem, but they have other disadvantages of their own as set forth above and as is known to those skilled in the art. The present invention thus is of a totally different design than a bypass regulator, to thereby avoid all of its disadvantages. However, the problems with non-bypass regulators are serious in the prior art, and they are solved by the present invention.

Plunger type regulators in the prior art produce a seal in one of two manners. There are some that use a separate sealing member, such as an "O"-ring formed of rubber or other elastomeric material. There are others which provide physical contact between the surfaces of the plunger and the valve seat itself, sometimes with and sometimes without a separate resilient sealing means.

Another problem with ball valves which is not present in plunger type valves such as those of the invention which use a hard surface contact, is that there is a pressure magnification on the seal. That is, as is clear, a ball contacting a conical seat creates a line of contact. Pressure on the parts magnifies tremendously the force at this line of contact. That makes it more difficult, increases response time and increases pressure drop, to "break" or open such a seal. In the present invention there is no such pressure magnification problem because of the relatively larger surface area, metal to metal or other hard surface, at which the seal is created.

The problem with an elastomeric seal is that it slows down the response of the valve. That is, the compressed material must be decompressed or returned to its normal physical condition before the valve can open. That causes a pressure drop and a loss of time. Thus, valves of the prior art that utilize a resilient member as the main seal are unacceptable for this reason. Again, racing drivers with their complete instrumentation are aware of the response time as well as the pressure drop, and thus prefer not to use such devices.

Ball type valves almost always use metal to metal or other hard surface contact for the seal. The problem with these valves as well as plunger types that do not use an elastomeric seal is that they tend to chatter, pulsate, fluctuate and the like during use in the environment of the invention.

SUMMARY AND ADVANTAGES OF THE INVENTION

The invention provides a plunger type sealing member in a regulator for use in this special environment which solves all of these problems. The plunger head is formed with a groove into which is fitted a conventional "O"-ring. However, this "O"-ring does not serve as the primary seal. It protrudes out of the surface of the plunger in which it is seated only a very small distance and it does, perhaps, have some sealing efficacy. However, that is not important, the main seal is the metal to metal or other hard surface contact between the plunger and the valve seat.

The real purpose of this "O"-ring is to create a venturi effect at the normal operating conditions of the valve when the plunger is only slightly open and when it is partially open. This creates a cushioning effect in the area of the venturi, and this cushion effect has been found to be highly effective in eliminating the undesirable pulsing, chattering, hammering and the like which is a chronic problem in the prior art of such devices.

The parts are configured in such a way that the "O"-ring compresses entirely into its groove in the plunger nose thus minimizing its sealing effect when seated on its seat. But this "O"-ring also maximizes its venturi creating effect at conditions wherein the valve is at least slightly open because it protrudes slightly beyond the sealing member. Because the pump output is great and the demand from the carburetor is relatively small under most conditions, the throttling effect of the invention regulator is normally great. It is at those conditions that the venturi creates the cushion which prevents the pulsing, chattering and the like.

The reason for this protrusion of the elastomeric member in the plunger nose to be only a very short distance is to minimize, and in fact to just about totally eliminate, the delay in response time and the pressure drop created by the unsealing of that member from its contact with the valve seat. That is, since it is only compressed a tiny amount, it decompresses substantially instantaneously, and then the hard surface contact breaks instantaneously, and thus there is provided a highly responsive pressure regulator, that is, responsive to a need for immediate power for passing and the like as is often required in the environment of the invention.

In the successfully constructed embodiment of the invention, both the plunger and the seat have been made of metal. Thus, the primary seal is "metal-to-metal". However, other hard materials such as certain plastics, ceramics, and the like could as well be used. Therefore, the term, "hard surface contact" and the like as used in the specification and claims herein shall be understood to mean any such non-resilient materials usable in pressure regulators to create a seal.

Another advantageous feature of the invention is that the plunger is made of aluminum. This further increases the response time because of the relatively light weight of this moving part as compared to what its weight would be were it formed of steel or other heavier material.

Another feature of the invention is the provision of a pin secured at one end to the diaphragm assembly, and fitted into an opening at the other end in the plunger. By way of the lengths of the pin and the hole in the plunger receiving the pin, a situation is assured wherein disengagement of the diaphragm pin out of the plunger is rendered impossible. That is, under all conditions, because of the length of the pin and the length of the hole and the plunger receiving the pin, disengagement of these two parts is impossible short of a breakage of parts.

Thus, the invention provides a more or less conventional diaphragm operated, plunger type non-return pressure regulator, fitted with an "O"-ring, but wherein the "O"-ring protrudes only slightly above the sealing face of the plunger. This "O"-ring creates a zone of reduced pressure in its vicinity at the relatively slightly opened conditions of the regulator. In the occasionally used full open condition, the "O"-ring venturi effect is negligible. However, the substantial venturi effect, an advantage achieved at all slightly open conditions, acts as a cushion to prevent closure of the valve, and to totally avoid both lateral and lengthwise pulsations, fluctuations, and the like.

The invention pressure regulator is normally open in use. That is, the diaphragm spring urging the valve open is of greater strength than the plunger spring urging it closed. This also should be contrasted to the prior art having the opposite arrangement, the method of operation being completely different for such prior art normally closed valves.

Thus, the present invention provides a pressure regulator of the character described for use in the environment described, which achieves maximum flow, suffers a minimum pressure drop, responds relatively instantaneously, and totally avoids the problems chronic in the prior art of pulsation, chatter and the like.

BRIEF DESCRIPTION OF THE FIGURES OF THE DRAWINGS

The invention will be best understood from a careful study of the following detailed description taken in conjunction with the attached drawings, which drawings also form a part of this disclosure, and in which:

FIG. 1 is a schematic drawing showing the environment of the invention;

FIG. 2 is a vertical cross-sectional view showing the invention pressure regulator in the fully opened position;

FIG. 3 is a view similar to FIG. 2 but showing a modified pressure regulator in the fully closed position in accordance with the present invention;

DETAILED DESCRIPTION OF THE PREFERRED EMBODIMENTS

Figure 4:
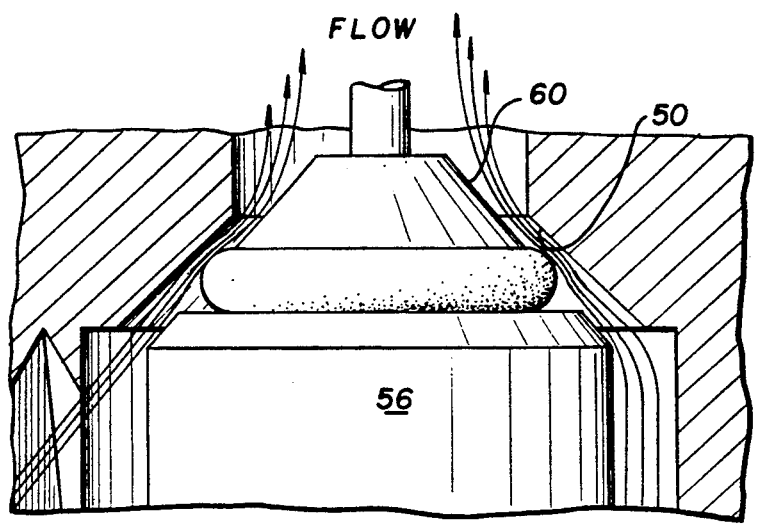
FIG. 4 is an enlarged showing of the plunger and valve seat in the slightly open or slow cruise position.

Referring first to FIG. 1, the invention regulator 10 is indicated schematically in the environment in which it is intended to be used. This comprises a simple series arrangement of a fuel tank 12, a filter 14, a fuel pump 16, an invention regulator 10, and finally a carburetor, or other point of use 18. While this schematic also represents a conventional automobile, it is to be understood that the invention regulator 10 is intended for usage together with pumps 16 which are of the high output/high pressure type for use in racing and other such high demand environments.

Figure 8:
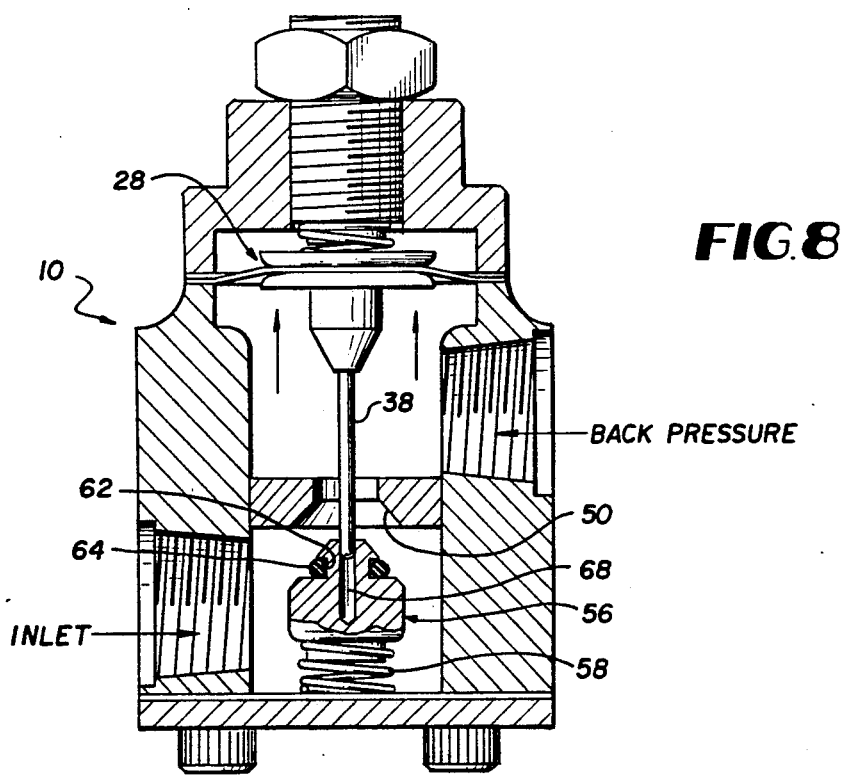
FIG. 8 is an enlarged view similar to FIG. 3 showing the plunger pin fail-safe operating feature.

Referring to FIGS. 2, 3, and 8, the invention regulator 10 is made up of a main body 20, an upper or diaphragm end cap or member 22 and a bottom plate 24. Bolts or the like securing means 26 are provided to removably attach the plate 24 to one end of the body 20. Other such means not shown are provided to hold the cap 22 in place.

Held securely between the cap 22 and the upper end of the body 20, is a diaphragm assembly 28.

Diaphragm assembly 28 causes operation of plunger 56 with respect to valve seat 50 between the FIGS. 2 and 3 positions, as is normally required by usage of the invention regulator in an internal combustion engine. To this end, the diaphragm end cap 22 is provided with an adjusting screw and nut arrangement 30 which controls the tension of a spring 32 which is constrained between the diaphragm assembly 28 and the end of the screw 30.

On the side of diaphragm 34 opposite spring 32 and facing seat 50, the diaphragm assembly includes a mounting plate 36 which is used to join a pin 38 to the diaphragm. Diaphragm pin 38 reaches through the wall 46 and cooperates with plunger 56 to control the opened and closed conditions of the pressure regulator as shown in FIGS. 2 and 3.

Intermediate its ends the main body 20 is formed with a wall 46. This wall can be integral with the body as shown in FIG. 2 or it can be a separate member as shown in FIG. 3. The wall 46 is formed with a thru passageway, made up of a cylindrical portion 48 and a conical valve seat 50. A complimentary function of the wall 46 is to divide the space inside the regulator body 20 into an inlet chamber 52 and an outlet chamber 54, each provided with suitable inlet and outlet means respectably, as indicated schematically in FIGS. 1 and 2.

Mounted in the inlet chamber 52 is a plunger type seal and throttle member 56. A spring 58 is provided between the plate 24 and the lower end of the member 56 to normally bias the member 56 to the sealed condition as shown in FIG. 3.

However, the diaphragm spring 32 is of greater strength than the plunger spring 58. The diaphragm assembly 28 and the plunger 56 is such as to hold the parts in the FIG. 2 position. Thus, one can properly think of the invention pressure regulator as being a "normally open" valve or regulator.

The invention as shown is comprised essentially of aluminum parts, especially the body 20. Where the wall 46 is integral, it too would then be aluminum. Where it is separate, as shown in FIG. 3, it can be formed of other materials, such as brass, ceramic, certain grades of plastic and the like. Likewise, the plunger seal and throttle member 56 may be formed of aluminum, brass, other metals, or other materials, including those mentioned above in regard to the wall 46. What is important for the invention is that there be what shall be referred to herein as a "hard surface" seal between the member 56 and the conical surface of the wall 46. Further as to materials, it is believed that making the plunger member 56 of aluminum, plastic, or the like will have advantages, in that the plunger will respond faster in use due to its lighter weight. Quick response in the high demand racing or other environments in which the invention is used is a highly desirable feature. The material must be resistant to corrosion and must wear well. Corrosion resistance is needed because the invention is handling hydrocarbon and other fuels at high volume and at high pressure, which are corrosive Grade 6061 aluminum has been found to work quite well.

The normally open arrangement of the invention provides advantages over all other pressure regulators in the prior art which are normally closed. The reason being normally open is an advantage over the prior art in that response time is quicker than normally closed valves. As will appear in detail below, the invention monitors and throttles fuel supply to the carburetor or other point of use 18, as opposed to operating upon a test fluid flow. It is only as required by signals from the carburetor or other point of use 18 that fuel flow is increased, reduced or shut off, as will be explained below.

Figure 7:
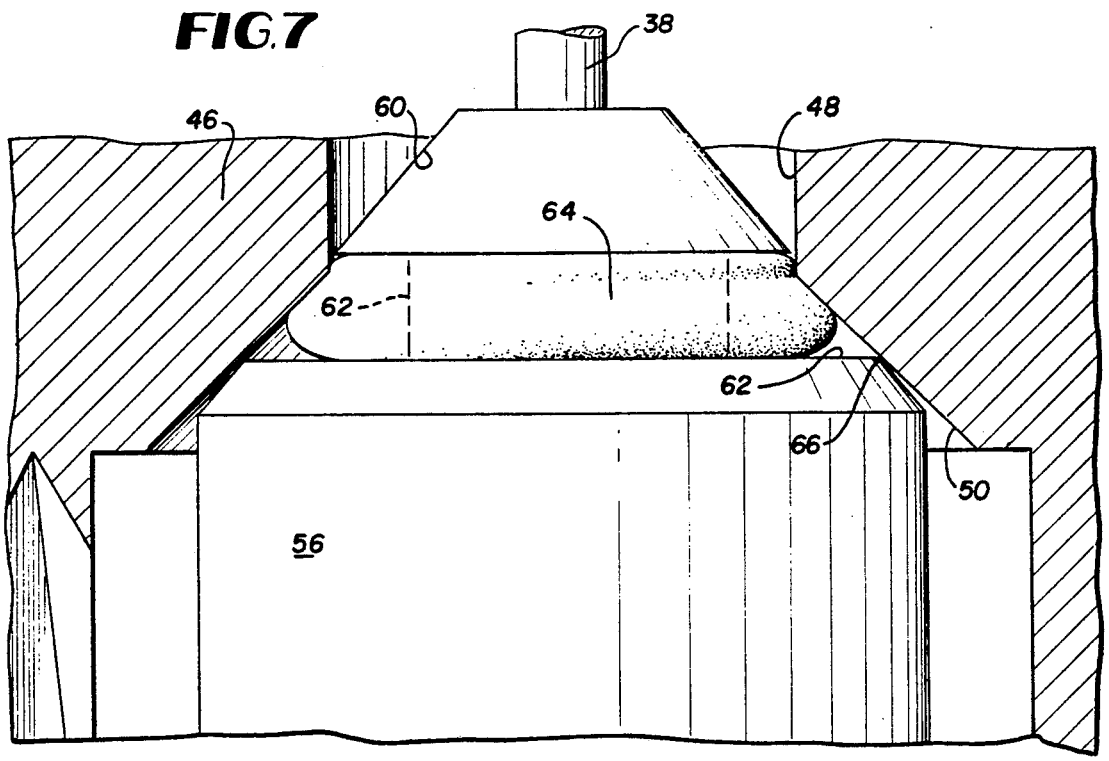
FIG. 7 is a greatly enlarged view showing the valve seating arrangement according to the invention.

Referring now to FIG. 7, the top, front, or operating end of the member 56 comprises a conical surface 60. Intermediate the ends of the surface 60 the member 56 is formed with an "O"-ring groove 62. An "O"-ring 64 is seated in groove 62. An edge or edge area 66 is formed at the large end of the "O"-ring groove 62 and its intersection with the nose or conical surface 60 forms the main seal through the invention regulator.

Most of the advantages flow from this structure illustrated in FIG. 7. As is readily visible, the parts being shown in the sealed condition as in FIG. 3, the primary seal is formed at the hard surface contact between edge 66 and surface 50 of the wall 46. A secondary seal is formed between the front or small end of the conical surface 50 and the "O"-ring 64. It is to be understood that the surface 60 is one continuous surface, extending at the same angle to both sides of the "O"-ring 64.

In FIG. 7, the interference angle is shown somewhat exaggerated. That is, in fact, the angle of the conical surface 50 and the angle of the conical surface 60 are closer to each other than is indicated in FIG. 7. The exaggeration has been provided to more accurately illustrate the method of operation of the invention. Further, as can also be seen by comparison of FIG. 7 with any one of FIGS. 4, 5, and 6, the amount of protrusion in the non-contacting or open condition of the "O"-ring with respect to the surface 50 is relatively small. To see this, a straight edge can be laid across both sides of the surface 60 in one of FIGS. 4, 5, and 6, and the relatively small amount of protrusion of the "O"-ring beyond that line becomes clear.

This relatively small protrusion, which produces only a secondary seal and not the primary seal which is produced at the hard surface contact, is a carefully designed feature of the invention. Because the "O"-ring protrudes above the surface 60 only a few thousandths of an inch in the successfully constructed embodiment, there is not enough elastic material to cause an undesirable condition known as "rebound". This is a common occurrence in many valves, especially in high pressure environments, when the "O"-ring is the primary seal. The sealing member literally bounces on the "O"-ring when rapid closing is required. This is totally unacceptable in the environment of the invention. Because the invention "O"-ring only protrudes this relatively tiny amount, there is no possibility of any such undesirable rebound, because there is not enough elastic material to power or drive such a rebound. On the closing cycle, the "O"-ring compresses as shown in FIG. 7, (which is an exaggerated showing), and the main seal is formed at the edge 66 with some surface contact between the surfaces 50 and 60, again, this being not precisely shown due to the exaggeration of the angles in FIG. 7. Further, a comparison of FIGS. 4 and 8 will also show that in the closed position the "O"-ring compresses substantially entirely into its groove. This is so because, due to the conical taper of the surface of the nose of the plunger, there is adequate space at the large end of the conical nose into which the rubber or other resilient material of the "O"-ring can be pushed upon closing of the plunger onto its seat 50. Further, in this same regard, during the development of the invention, larger size "O"-rings that would have produced more protrusion of the "O"-ring material were tried. These larger sizes of "O"-rings were found to work less satisfactorily than those in which the protrusion is only on the order of a few thousandths of an inch. Of course, such larger "O"-rings may produce a more secure secondary seal, but that is not important. The rapid operation is what is important, and larger "O"-rings deteriorate those qualities. The hard surface contact is the main seal and that operates perfectly satisfactorily with little assistance from the secondary "O"-ring seal. It is presently thought that protrusions of the "O"-ring beyond the surface 50 in the range of about 0.002 to about 0.020 of an inch are desirable and operative for most sizes of the pressure regulators currently in use in automobile racing.

It should be also noted that the groove 62 is correspondingly deep, since only a tiny protrusion of the "O"-ring beyond surface 60 is required. This yields another advantage of the "O"-ring being very good in regard to self-retention. That is, accidental removal or dropping off of the "O"-ring is virtually impossible. This is shown most clearly in FIG. 8.

As is also clear from FIG. 7, the edges at the primary and the secondary seal are relatively sharp. We have found that this, somewhat surprisingly, produces better overall performance and tighter seals. The conventional art is to provide broken edges or radii at such relatively sharp edges. This is deemed another improvement of the invention.

Figure 5:
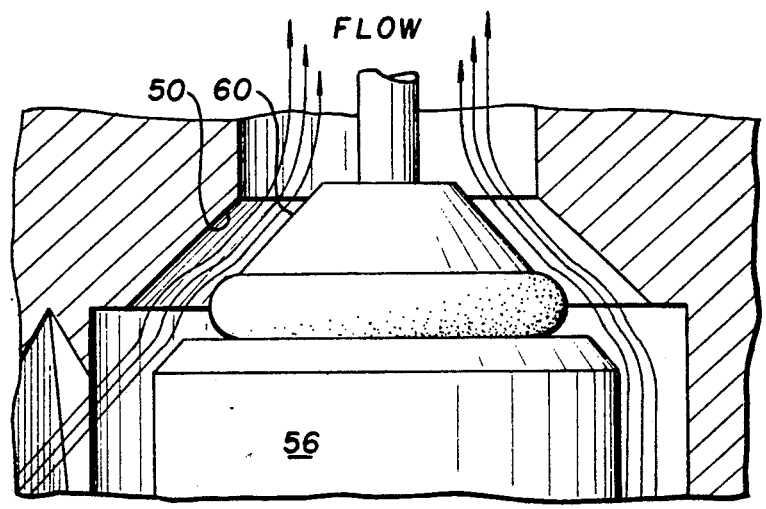
FIG. 5 is a view similar to FIG. 4 but showing the parts in the partially open or acceleration or high speed cruising position.
Figure 6:
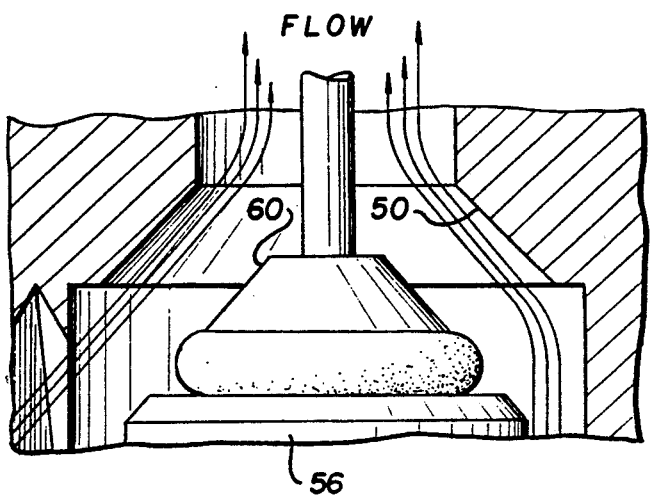
FIG. 6 is a view similar to FIG. 4 but showing the parts in the fully open position as would occur at the gear shifting points or extremely hard acceleration.

Referring now to FIGS. 4, 5, and 6, the method of the invention and the manner in which it produces and improves performance in a regulator in this harsh and demanding environment will be shown and explained. Overall, the invention operates by utilizing the "O"-ring, which acts only as a secondary seal, to create a venturi which accelerates the fluid and creates a reduced pressure region. This reduced pressure region acts as a cushion to prevent chatter, pulsation, and other undesirable characteristics which are presently problems in the prior art.

More specifically, it is thought that the venturi effect created by the "O"-ring causes a drop in pressure and increases the velocity of the fuel flow between the plunger and the valve seat to prevent chatter. This drop in pressure results in a low pressure zone surrounded by a pair of higher pressure zones such that the pair of higher pressure zones and the low pressure zone all occur between the plunger and the valve seat to create the cushioning effect. The fuel flow between these high and low pressure zones prevents further displacement of the plunger and holds the plunger steady to prevent chatter.

Turning now in more detail to FIGS. 4, 5, and 6, FIG. 4 shows the only slightly open condition of the sealing parts. As indicated by the flow lines, in this condition the venturi effect is at its greatest, and this is exactly the operating conditions at which the venturi effect needs to be at its greatest. The low pressure zone indicated by the compression of the flow arrows act as a cushion for the valve in its small motions within this general area of operation shown in FIG. 4. Because of the relatively high pressure and high volume output of the pump 16, a substantial amount of throttling occurs in normal operation, that is, during slow or normal cruising or idle conditions within the area of activity indicated by FIG. 4.

FIG. 5 illustrates partially open conditions. The cushioning effect is still present but not as strong as it is in the FIG. 4 condition. This condition of the parts will be present during acceleration, or more high speed cruising when more fuel is needed. Again, there will be many minor changes of position of the member 56 between the FIG. 4 and FIG. 5 conditions, and under all of those circumstances the venturi effect will be present, the cushioning will occur, and the problems in the prior art having to do with chatter, pulsations, vibration, and the like are virtually entirely eliminated.

Finally, FIG. 6 shows the fully opened condition of the pressure regulator of the invention. This occurs during very hard acceleration, and at the shift points during demanding operation of the engine. At this time, the venturi is virtually non-existent. This is acceptable since a relatively large percentage of the high pressure, high volume output of the pump is required to be passed through the regulator and on to the point of use. Thus, the cushioning required for chatter prevention and the like is unimportant at this time, since the opening through the pressure regulator is relatively large and chatter is not a problem at this time.

As mentioned above, racing car drivers frequently use the present invention as now commercially developed. Their automobiles are fully instrumented and so in addition to their human senses to feel chatter, hesitation, pulsation or the like, they can see the performance of the engine on the gauges. The gauges are much more sensitive than human senses, and the driver will be aware of the slightest pulsation. The present invention, in that very carefully observed and highly demanding environment, has performed highly satisfactorily, the improvements over the prior art have been well received and are well appreciated by the users. In many particular applications, the pulsation, chatter and the like are virtually entirely eliminated. These undesirable performance characteristics of chatter and the like are undesirable because they cause a loss of power, which in turn causes a loss of speed, which in turn can mean the difference between winning and losing a race.

FIG. 8 also shows a "fail-safe" feature of the invention in regard to disengagement of the operating pin 38 of the diaphragm assembly 28 with respect to the plunger member 56. To this end, the plunger 56 is formed with an axial opening 68 of a predetermined depth and diameter. The diameter is such as to loosely receive the pin 38. The depth is such that under the extreme conditions illustrated in FIG. 8, even then the pin 38 cannot disengage from the opening 68 in pin 56. This extreme condition is one wherein the back pressure from the point of use, indicated by the arrow in FIG. 8, comes on quickly, and the response of the diaphragm assembly 28 is faster than the response of the spring 58 driving the plunger 56. Under those circumstances, the extreme possible disengagement of the pin 38 with respect to the opening 68 occurs. The parts are so configured that even under this extreme condition, still a substantial part of the tip end of the pin 38 remains in the opening 68.

Another feature of the invention is clear from FIG. 8. That is, the invention is applicable to the type of regulator which responds to such back pressures, as opposed to those which respond to pressures at the inlet. This usually means that the invention is applicable to only a pressure regulator having a diaphragm operated plunger.

Another important advantage of the invention, clear from the Figures and the above description, is that, while avoiding the prior art problems of pulsations, chattering, hydraulic hammering, and the like, still there is provided a pressure regulator having very minimal flow restrictions, while still keeping the high velocity, high pressure fuel moving through the regulator.

Another feature of the invention, clear from FIG. 7, is that this relatively small, hard surface primary seal opens very readily when needed. This is to be contrasted with other prior art valves that have a large resilient member or large surface areas in contact to create the seal. Such larger areas and such larger resilient members cause a time delay in opening, which is unacceptable in the high demand environment for which the present invention was developed.

In actual usage, the pumps with which the invention has been used can produce flow rates of up to 500 gal./hr., pump capacities of 140, 250 and 500 qal./hr. are ordinary. Pressures in the range of 6-25 psi are common at the pump with the carburetor or other end point of use usually operating at a maximum of 7 psi. As to fluid flow rates, at the carburetor or other end point of use, that, of course, is a function of the desired performance characteristics of the car. However, as in the case of the fluid pressure, the required fluid flow rate is less at the carburetor or other end point of use than at the pump.

The reason for this differential between maximum potential fluid pressures and fluid flow rates at the pump and that which is actually employed at the carburetor or other end point of use, relates to the need to maintain the fuel reservoir in the float bowl of the carburetor at a maximum level at all times. Due to the inertia of the fluid while it is at rest in the fuel line to the carburetor when the carburetor needle and seat is in the closed position, it takes an extraordinary increase in fluid pressure and fluid flow rate, above what would be required in a steady state of operation, to force the fuel through the fuel line and into the carburetor float bowl, once the carburetor needle and seat open, in a short enough time span so as to prevent the engine from suffering an abnormally lean air to fuel mixture ratio and thus losing performance.

For the car's fuel system to function properly in response to both of these rapidly changing demands for fuel and the high fluid pressures and fluid flow rates needed to achieve a satisfactory response to these changes, the regulator must be able to react quickly to the slightest change in back pressure in the fuel system. Any delay in response of the regulator can lead to an abnormally lean air to fuel mixture ratio which would have a negative impact on the car's performance. The advantage of this invention over the prior art is that it is capable of reacting almost immediately to very small changes in back pressure in the fuel system. With the invention, the carburetor float bowl can be rapidly refilled with fuel so as to always be kept substantially full of fuel without the need for a significant decrease in the volume of fuel in the carburetor float bowl having to occur prior to the regulator sensing the change in fuel system back pressure and allowing additional fuel to flow into the carburetor float bowl, was as the case in the prior art.

In prior art regulators, the driver of the car could discern a significant pressure drop in his car's fuel system prior to fuel being fed to the carburetor, especially under heavy load conditions. However, with the present invention, due to its quick response to changes in fuel system back pressure, there is virtually no discernible loss of fuel system pressure prior to fuel being fed to the carburetor. Hence, this invention contributes significantly to the maintenance of a stable air to fuel mixture in all ranges of operation, which enhances the performance characteristics of the car.

While the invention has been described in detail above, it is to be understood that this detailed description is by way of example only, and the protection granted is to be limited only by the spirit of the invention and the scope of the following claims.

We claim:

1. A method of operating a throttling valve between a relatively high pressure and relatively large liquid volume pump means and a point of use to avoid chatter, pulsations and the like especially when said throttling valve is in the range of very slightly to slightly opened, said throttling valve being of the type having a plunger operating on a valve seat and operated by diaphragm means in response to the pressure on the output side of said throttling valve, comprising the steps of creating a pressure cushion between said plunger and said valve seat by creating a venturi effect between said plunger and said valve seat when said throttling valve is in said range, providing a pair of conical surfaces one each on said plunger and on said valve seat, locating said pair of conical surfaces to be substantially parallel to each other and spaced from each other during operation of said valve in said range, providing an "O"-ring associated with said plunger extending from said plunger into the space between said plunger and said valve seat, the protrusion of said "O"-ring into said space being effective to create said venturi, said cushion being effective to prevent said chatter, pulsations and the like of said plunger, and the step of preventing said plunger from contacting other parts of said valve in all positions of said plunger except the closed condition of said throttling valve.

2. The method of claim 1, and operating said pump means in the range of about 6 to 25 psi and at flows of up to 500 gallons per hour, and delivering the liquid from said pump means through said throttling valve to said point of use at pressures of about 7 psi.

3. The method of claim 1, and the step of causing said throttling valve to be normally open.

4. The method of claim 3, said last mentioned step being performed by the steps of providing spring means associated with said plunger to urge said plunger to the closed position with respect to said valve seat and providing second spring means acting upon said plunger to urge said plunger to the open position with respect to said valve seat, and selecting said second spring means to be stronger than said plunger spring means.

5. The method of claim 4, and the step of manually selecting the force of said second spring means acting on said plunger.

6. The method of claim 1, and the steps of selecting the materials of said plunger and of said valve seat to be capable of being formed with a hard sealing surface, and selecting said materials from the group consisting of metals comprising brass and aluminum and non-metals comprising ceramics and plastics.

7. The method of claim 1, and configuring and locating said pair of conical surfaces and said "O"-ring such that said venturi causes a drop in pressure and increased velocity of the fuel flowing through said space between said plunger and said valve seat, causing said drop in pressure to create a pair of higher pressure zones surrounding a low pressure zone, and causing all of said zones to occur in said space between said plunger and valve seat which creates said cushioning effect and to thereby hold said plunger steady to thereby prevent said chatter, pulsations and the like of said plunger.

8. A method of operating a throttling valve between a relatively high pressure and relatively large liquid volume pump means and a point of use to avoid chatter, pulsations and the like especially when said throttling vale is in the range of very slightly to slightly opened, said throttling valve being of the type having a plunger operating on a valve seat and operated by diaphragm means in response to the pressure on the output side of said throttling valve, comprising the steps of creating a pressure cushion between said plunger and said valve seat when said throttling valve is in said range, said cushion being effective to prevent said chatter, pulsations and the like of said plunger, and the step of preventing said plunger from contacting other parts of said valve in all positions of said plunger except the closed condition of said throttling valve, said step of creating said cushion being performed by the step of providing an "O"-ring associated with said plunger for cooperation with said valve seat, wherein said plunger and said valve seat provide the primary seal through said throttling valve and said "O"-ring and said valve seat provide a secondary seal only, selecting the shapes and sizes of said "O"-ring and said plunger and said valve seat such that said "O"-ring protrudes beyond said plunger in the unsealed condition of said plunger on said valve seat a selected relatively small distance, and selecting said distance such that said cushion is created in said range of openness of said throttling valve.

9. The method of claim 8, said selected relatively small distance being in the range of about 0.002 inches to about 0.020 inches.

10. The method of claim 8, wherein said cushion is created by the step of using said "O"-ring to create a venturi effect between said plunger and said valve seat.

11. The method of claim 8, and the steps of forming a groove in said plunger for carrying said "O"-ring therein, said sizing and shaping said groove and said "O"-ring so that said "O"-ring will compress substantially entirely into said groove in said plunger in the closed condition of said throttling valve.

12. A method of operating a throttling valve between a relatively high pressure and relatively large liquid volume pump means and a point of use to avoid chatter, pulsations and the like especially when said throttling valve is in the range of very slightly to slightly opened, said throttling valve being of the type having a plunger operating on a valve seat and operated by diagram means in response to the pressure on the output side of said throttling valve, comprising the steps of creating a pressure cushion between said plunger and said valve seat when said throttling valve is in said range, said cushion being effective to prevent said chatter, pulsations and the like of said plunger, and the step of preventing said plunger from contacting other parts of said valve in all positions of said plunger except the closed condition of said throttling valve, and providing fail-safe means adapted to prevent disengagement of the portion of said diaphragm means in contact with said plunger under all extremes of operating positions of said plunger and said diaphragm means.

13. The method of claim 12, and providing operating pin means as part of said diaphragm means, said step of providing fail-safe means including the steps of forming an opening in said plunger, fitting the free end of said operating pin means into said plunger opening, and selecting the shapes and sizes of said pin means and said plunger opening so that at least a portion of said pin means remains in said plunger opening even when said plunger and said diaphragm means are at maximum separation from each other.

* * * * *